(12) United States Patent
Anupam et al.

(10) Patent No.: US 6,360,250 B1
(45) Date of Patent: Mar. 19, 2002

(54) APPARATUS AND METHOD FOR SHARING INFORMATION IN SIMULTANEOUSLY VIEWED DOCUMENTS ON A COMMUNICATION SYSTEM

(75) Inventors: Vinod Anupam, Scotch Plains; Narain H. Gehani, Summit, both of NJ (US); Viswanath Kadambari, Herndon, VA (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/221,068

(22) Filed: Dec. 28, 1998

(51) Int. Cl.$^7$ ............................................. G06F 13/00
(52) U.S. Cl. ........................................ 709/204; 709/205
(58) Field of Search .................................. 709/204, 205

(56) References Cited

U.S. PATENT DOCUMENTS

| | | | | |
|---|---|---|---|---|
| 5,862,330 A | * | 1/1999 | Anupam et al. | 709/204 |
| 5,944,791 A | * | 8/1999 | Scherpbier | 709/218 |
| 5,991,796 A | * | 11/1999 | Anupam et al. | 709/206 |
| 6,070,185 A | * | 5/2000 | Anupam et al. | 709/204 |
| 6,230,171 B1 | * | 5/2001 | Pacifici et al. | 707/512 |
| 6,295,551 B1 | * | 9/2001 | Roberts et al. | 709/205 |

FOREIGN PATENT DOCUMENTS

EP 0 989501 * 3/2000

* cited by examiner

*Primary Examiner*—Kenneth R. Coulter

(57) ABSTRACT

Computer users may utilize different web browsers to access a server system on the World Wide Web (WWW) to create or join a collaborative browsing session. One or more controllers connect the users or collaborators in a session in the server system. This is realized by establishing a so-called "shared Web-top", i.e., a work space, in which different in-document applications can be run and can be interactively, collaboratively shared by a plurality of users. Specifically, this is realized in one embodiment by employing event handlers in the WEB documents that are activated whenever there is a change in the values of prescribed properties of a document. The event handlers notify a so-called surrogate of the changes in the prescribed properties of the document, i.e., that values in elements of a form have changed, and transmit the detected changes to surrogates of other users, i.e., at least one other collaborator, via a communication channel. To this end, a prospective user of the shared Web-top accesses a system that transmits mobile code to the user's computer to create a surrogate thereon. The surrogates created for the users of the shared Web-top are connected by at least one controller in the system and individually serve as an interface between the controller and the respective browsers on the users computers. Alternatively, the surrogate can insert event handlers into the document that communicate with the surrogate, identifying which form elements they apply to and transmit the changed value(s) to other users. The surrogates of the other users then appropriately update the corresponding form elements to reflect the changes.

60 Claims, 6 Drawing Sheets

APPARATUS AND METHOD FOR SHARING INFORMATION IN SIMULTANEOUSLY VIEWED DOCUMENTS ON A COMMUNICATION SYSTEM

RELATED APPLICATIONS

U.S. patent application Ser. No. 09/221,069 and Ser. No. 09/221,067 were filed concurrently herewith.

FIELD OF THE INVENTION

The invention relates to systems and methods for providing communications between users over a computer network and, more particularly, to systems and methods for providing collaborative browsing of information and interactive communications on the World Wide Web (WWW) or the "web".

BACKGROUND OF THE INVENTION

Computer users can access many resources on an expansive international network of computer networks known as the Internet. WWW is a graphical subnetwork of the Internet. With common "web browser" software, for example, the NETSCAPE browser, users can readily access Internet information or services provided by web servers on the WWW.

Many Internet services allow communications between users. For example, two or more computer users may access a designated web server providing a "text-chat" service, that allows users to communicate interactively in text with one another in real time.

Computer users can also share web browsing experiences using a SHARED MOSAIC browser. To that end, each user is required to have his/her own copy of the SHARED MOSAIC software on a computer. To establish links between a user and his/her collaborators, the user needs to communicate to the collaborators beforehand, for example, by email or telephone, an Internet protocol (IP) port number identifying his/her particular browser. Then, the collaborators run the respective browsers on their computers and enter the IP port number as communicated, thereby establishing the links through the Internet between the user's computer and the collaborators' computers. As the user is visiting a web site of interest, he/she can select an option provided by the browser to share with his/her collaborators the same information from the web site through the established links.

More recently, a technique has been developed for shared browsing using unmodified browsers and servers. A client-side executable content, know as a surrogate, is used that is dynamically downloaded into the user's browser. The browser communicates with a collaborator's surrogate and allows all of the users' so-called "connected" browsers to move from page to page of a document in synchrony.

Notwithstanding the prior known collaborative browser arrangements, a problem still exists concerning the users being able to collaborate interactively regarding the content of a shared document or the like.

An attempt at overcoming these problems utilizes a polling technique in a surrogate for sharing values in a multi-user application, which employs simultaneously viewed documents on the WEB. This arrangement although advantageous in certain applications, requires the surrogate to periodically poll the viewed document to determine if any changes have occurred. Such polling is potentially expensive from the prospective of computation time and, therefore, inefficient.

SUMMARY OF THE INVENTION

This and other problems and limitations of prior interactive collaboration apparatus and/or techniques are overcome by establishing a so-called "shared Web-top", i.e., a work space, in which different in-document applications, for example, within a document page, can be run and can be interactively, collaboratively shared by a plurality of users.

Specifically, this is realized in one embodiment by employing so-called event handlers that are code statements inserted in the WEB documents that are activated whenever there is a change in the values of prescribed properties of a document. The event handlers notify a surrogate of the changes in the prescribed properties of the document, i.e., that values in elements of a form have changed, and transmit the detected changes to surrogates of other users, i.e., at least one other collaborator, via a communication channel. To this end, a prospective user of the shared Web-top accesses a system that transmits mobile code to the user's computer to create a surrogate thereon. The surrogates created for the users of the shared Web-top are connected by at least one controller in the system and individually serve as an interface between the controller and the respective browsers on the users computers.

Alternatively, the surrogate can insert event handlers into the document that communicate with the surrogate, identifying which form elements they apply to and transmit the changed value(s) to other users. The surrogates of the other users then appropriately update the corresponding form elements to reflect the changes.

Advantageously, through our unique use of the event handlers for notifying the surrogate of changes in the prescribed properties of the document, functionality is realized in which, as one user inputs data into a shared document, for example, into one or more forms in a document, the same data appears in the other user's browser, via the detected changes in prescribed properties of the one or more forms being transmitted over the communication channel to the users' computers and, therein, to their surrogates. The use of event handlers is significantly more computationally efficient than, for example, the polling technique, because the surrogate does not have to look actively for changes but just waits to be notified when there is a change.

DETAILED DESCRIPTION

Figure 1:
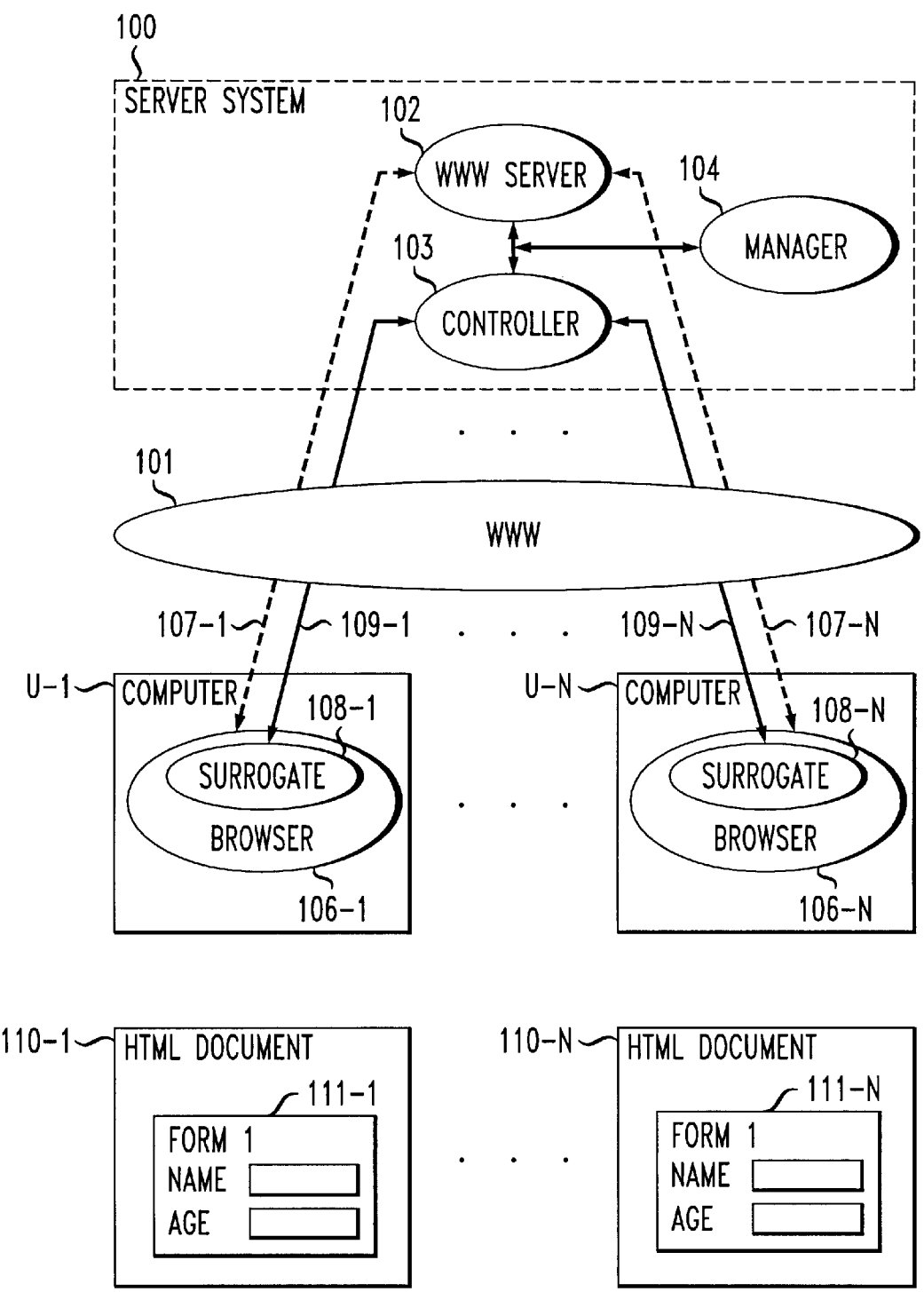
FIG. 1 is a simplified block diagram of a server system including an embodiment of the invention for obtaining and exchanging information over the WWW.

FIG. 1 shows, in simplified block diagram form, server system 100 embodying the principles of the invention, which is connected to the World Wide Web (WWW) 101 as a web server. Server system 100 includes WWW server 102, controller 103 and manager 104. Advantageously, server system 100 operates compatibly with standard web browsers such as the NETSCAPE browser, the standard hypertext transfer protocol (HTTP) and hypertext markup language (HTML). Among other things, server system 100 provides users with services of (a) collaborative browsing of HTML documents at various web sites on WWW 101, and (b) real-time, interactive collaborative communications between the users. Specifically, with server system 100, during a collaborative browsing session, multiple users or collaborators are allowed to synchronously and collaboratively input data into a document or otherwise edit the document. The collaborators may also interact with one another through text-chat communications, for example. In addition, server system 100 allows users to join and exit an on-going session and is capable of scaling its capacity to accommodate a changing number of sessions and collaborators in a particular session.

As shown in FIG. 1, a user may utilize computer U-1 to access server system 100 over WWW 101 at a predetermined Uniform Resource Locator (URL). Computer U-1 may be a conventional personal computer (PC) running standard web browser 106-1, such as the NETSCAPE browser. As soon as U-1 is connected to server system 100 through link 107-1, manager 104 in server system 100 starts communicating with U-1 through web browser 106-1 and WWW server 102 having a common gate interface (CGI).

Figure 2A:
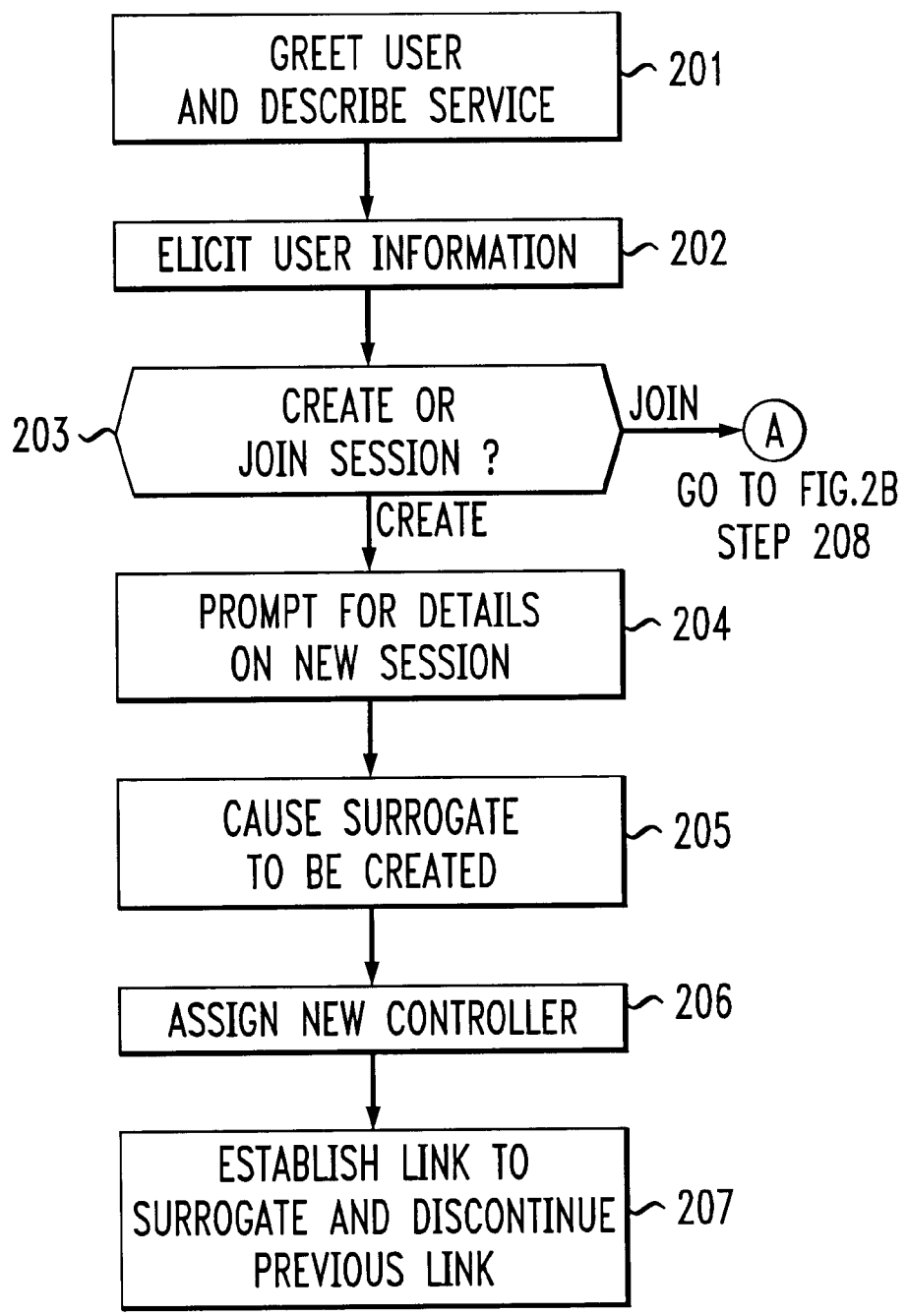
FIGS. 2A and 2B form a flow chart depicting the steps in carrying out the operation of the system of FIG, 1.
Figure 2B:
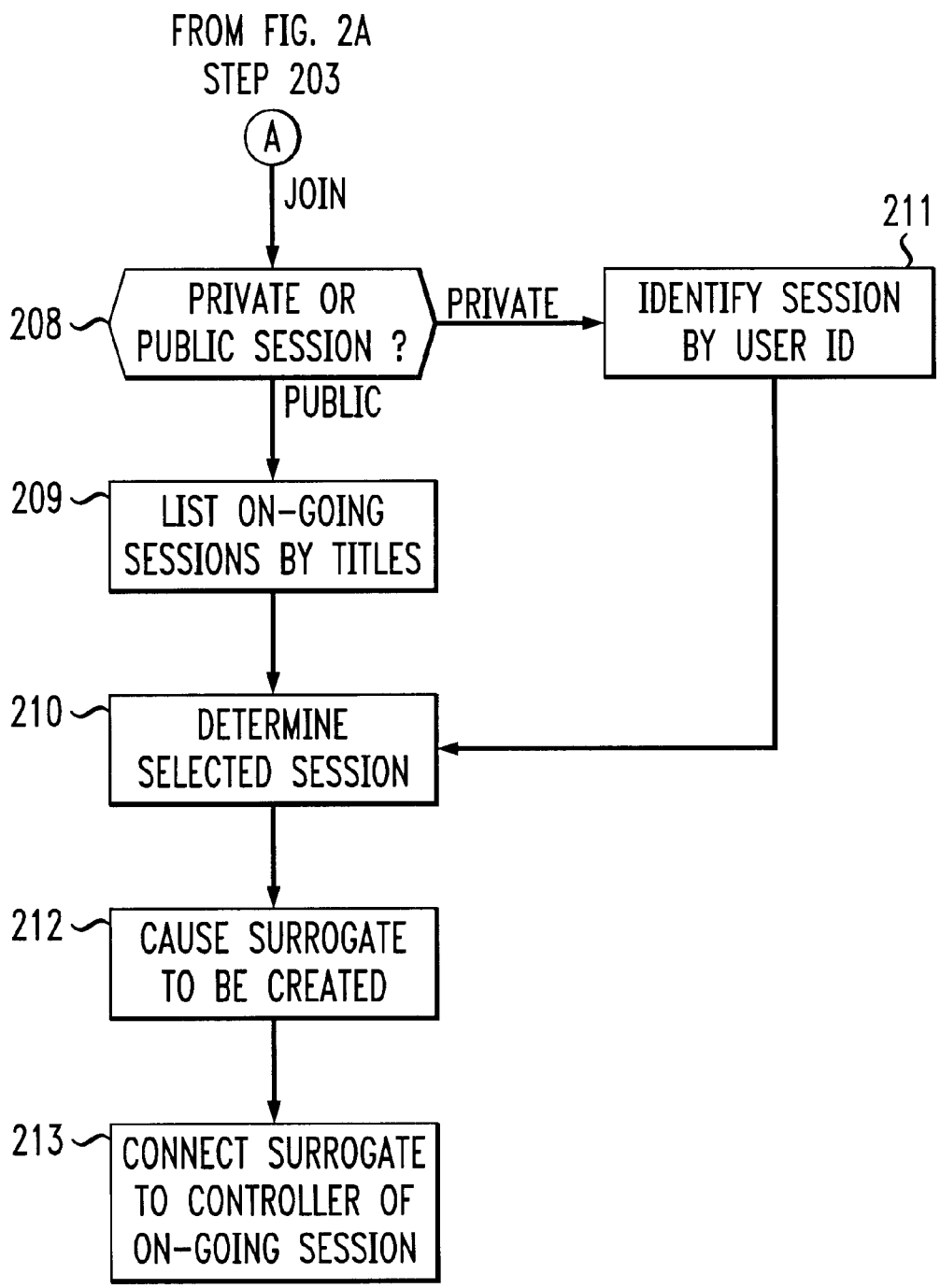

Manager 104 includes a service routine shown in FIG. 2A and FIG. 2B for helping a user to establish an interactive collaborative browsing session. FIGS. 2A and 2B illustrates the steps of a service routine including an embodiment of the invention. At step 201, manager 104 causes a "home page" to be displayed on U-1, which greets the user, and describes the service provided by server system 100. Manager 104 then elicits from U-1 user information, as indicated at step 202. This information includes a user identification (ID), password and other administrative data necessary for ensuring that the user is an authorized user. At step 203, manager 104 queries U-1 as to whether the user wants to create a session, or join an on-going session. In this instance, the user of U-1 chooses to create a session. Manager 104, at step 204, then prompts the user for the details on the session to be created, such as the purpose of or the document to be addressed during the session, and whether it is a private or public session. By way of example, if it is a private session, a would-be collaborator must identify the user by his/her user ID who created the session in order to join it. It is assumed that all sessions would be private that deal with filling-in personal or otherwise sensitive user information into documents, i.e., forms or the like. If it is a public session, the topic of or the document to be edited or filled in during the session is listed and is searchable by a prospective collaborator. In this embodiment of the invention, whether private or public, the session is interactive among the collaborators in order to collaboratively input data into the document, for example, into one or more forms in the document.

In this instance, the user of U-1 replies that the session to be created is private and the purpose of the session is to complete, for example, a medical insurance form. Manager 104 proceeds to start the new session and causes surrogate 108-1 to be created within browser 106-1 in computer U-1, as indicated at step 205. To that end, server system 100 transmits to computer U-1 mobile code pursuant to a mobile programming language such as the standard JAVA language. Thus, in this instance, the mobile code may be in the form of a JAVA applet. (For a discussion on JAVA and JAVA applets see, for example, "Teach Yourself JAVA in 21 Days, Professional Reference Edition" *Sam's Net*, Indianapolis, Ind., 1996 and/or "Learn JAVA Now", *Microsoft Press*, 1996.) Surrogate 108-1 is realized when the JAVA applet starts to run within browser 106-1 as soon as it reaches computer U-1. Surrogate 108-1 is further described below in relationship to FIG. 3, and it suffices to know for now that it serves as an assistant to browser 106-1 to carry out the session.

Since, in this instance it is a new session, manager 104 at step 206 assigns a new controller, numerically denoted 103, to control and regulate the session. Manager 104, at step 207, causes controller 103 to be connected to surrogate 108-1 through link 102-1, and at the same time discontinues link 107-1. Surrogate 108-1 serves as an interface between, browser 106-1 and controller 103. Among other things, surrogate 108-1 monitors user interaction with browser 106-1, and reports the user interaction to controller 103. It should be noted at this point that surrogate 108-1 is realized using a JAVA applet, which is transmitted to and executed on U-1 on an on-demand basis. Indeed, no software needs to be installed or maintained on the user computer beforehand, as is required in traditional applications. Thus, any standard JAVA-enabled browser such as the NETSCAPE browser can be utilized to implement the invention. In other words, server system 100 does not require the users to have specialized browser software to take advantage of the inventive service.

After the new session starts, the user of computer U-1 may change the URL with browser 106-1 to a web site to obtain information concerning the medical form to be completed. The new URL is transmitted by surrogate 108-1 to controller 103, where the new URL is recorded and conveyed to the surrogates of other collaborators, if any, in the same session. At the same time, browser 106-1 accesses a web server at the new URL, and opens on computer U-1 a HTLM document provided by the web server, in this example, an medical insurance form.

A second user may utilize computer U-N to access server system 100 at the predetermined URL to join an on-going session. After computer U-N establishes link 107-N to WWW server 102, manager 104 similarly performs steps 201 and 202 of FIG. 2A, previously described. However, at step 203, the user of U-N in this instance chooses to join an on-going session. As such, manager 104 queries U-N as to whether the second user wants to join a private session or public session, as indicated at step 208 in FIG. 2B. In this instance, the second user chooses to join a public session, and manager 104 proceeds to steps 209 and 210. Otherwise, the second user needs to identify the private session to be joined, by the user ID of the creator of that session, as indicated at step 211.

In any event, at step 208, manager 104 causes a list of all the on-going sessions to be displayed on computer U-N including the medical form session created by the user of computer U-1. Manager 104 then proceeds to step 210 where it determines the particular session selected by the second user. In this example, the second user chooses to join the private medical insurance form session by pointing and clicking using a mouse device at the listed topic. At step 212, surrogate 108-N is created on computer U-N, in a manner described before, within browser 106-N, which may be different from browser 106-1. Once surrogate 108-N is created, knowing that the medical insurance form session was assigned to controller 103, manager 104 causes controller 103 to be connected to surrogate 108-N through link 107-N, as indicated at step 213.

At that point, a message is sent by controller 103 to each collaborator's computer connected thereto about the presence of a new collaborator. The user of U-N is then afforded a chance to visit the sequence of URLs that the session has gone through to review its history. This sequence of URLs has been recorded and is updated in 103 as the session progresses. The user of, U-N is also afforded an option to browse new HTML documents synchronously with other collaborators. When that option is exercised, controller 103 sends the current URL to surrogate 108-N. The latter then directs web browser 106-N to open the HTML document at the current URL. During the medical form session, when browser 106-1 initiates a change in the URL, the new URL information is obtained by surrogate 108-1, and the latter communicates this information to the surrogates of all other collaborators via controller 103. Each surrogate then directs its respective browser to open the HTML document at the new URL. As such, the collaborators manage to synchronously move from one URL to another to browse documents as the session progresses.

In this particular embodiment, the creator of the session is afforded the same capabilities as the other collaborators, except that the creator has the control of leading the session. In addition, the surrogates connected to controller 103 are programmed to allow the collaborators to communicate interactively in text with one another in real time.

Figure 3:
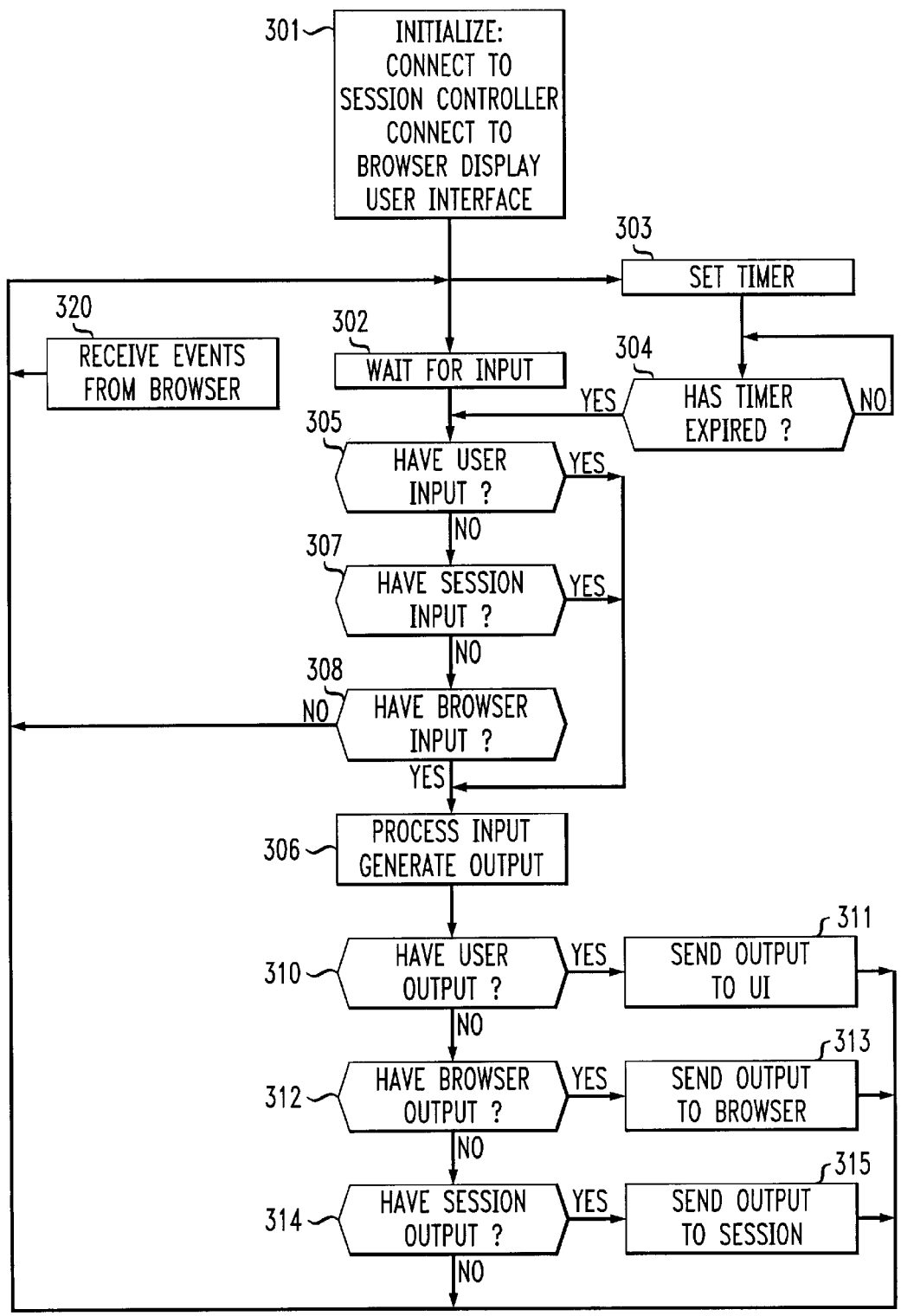
FIG. 3 is a flowchart illustrating the steps taken in a surrogate employed in the process of FIGS. 2A and 2B and including an embodiment of the invention.

FIG. 3 is a flowchart illustrating the steps taken in a surrogate 108 employed in the process of FIGS. 2A and 2B and including an embodiment of the invention. Specifically, surrogate 108 in step 301 initializes by connecting to session controller 103 and to browser 106 and displaying the user interface. Then, control is transferred to steps 302 and 303. In step 302, surrogate 106 waits for an input and in step 303 a timer is set to a predetermined interval. Step 304 tests to determine if the timer has timed out, i.e., whether the predetermined interval has expired, i.e., terminated. Steps 303 and 304 are employed to insure that an input check cycle will be initiated after a predetermined interval of not receiving an input.

Thus, the surrogate, in this example, periodically checks the document structure for changes in the values of prescribed properties, e.g., document elements or form elements, of the document, and transmits changes to the other collaborators in a session via a communication channel. It is noted that the documents do not have to be "collaboration aware", i.e., documents that were not created with an awareness of the potential that they may be filled in by multiple cooperating users. The only requirement is that the surrogate be able to read and write properties of the document. To this end, the surrogate monitors the activity as collaborators, i.e., users, enter data into the documents and, specifically, in forms included in the documents, and relays the entered data to the other users' surrogates so that the forms are collaboratively filled in.

Returning to FIG. 3, control is then transferred from step 304 to step 305. Returning to step 302, upon receiving an input, control is transferred to step 305, which tests to determine if there is a user input. If the test result in step 305 is YES, control is transferred to step 306 where the user input is processed to generate a session or browser output. If the test result in step 305 is NO, control is transferred to step 307, which tests to determine if there is a session input. If the test result in step 307 is YES, control is transferred to step 306 where the session input is processed to generate a user or browser output. If the test result in step 307 is NO, control is transferred to step 308, which tests to determine if there is a browser input. If the test result in step 308 is YES, control is transferred to step 306 where the session input is processed to generate a session output. If the test result in step 308 is NO, control is transferred to steps 302 and a 303.

Note that in step 320 events, i.e., changes in values of prescribed properties of elements, e.g.,forms, in a document, are received from the browser. In this manner the surrogate is notified by the event handlers of the changes in elements of the forms. These events are supplied to the surrogate as browser inputs. To realize this, however, the event handlers need to be inserted into the document and, hence, into the forms therein. Moreover, the event handlers can also be dynamically inserted into documents that are not collaborative aware. The only requirement being that there is a capability to insert the event handlers into the document. To this end, the event handlers may be inserted into the document by a WEB page author. The insertion of these event handlers can occur at the WWW server 102 (FIG. 1) providing the document, or be effected by the surrogate once the document has been retrieved.

In the HTML document used in this example and shown in FIG. 1, a WEB page author can use JavaScript to insert event handlers as follows:

```
<FORM>
  <INPUT    TYPE=TEXT    ONCHANGE=
    "nameChangeHandler( )">
  <INPUT    TYPE=TEXT    ONCHANGE=
    "ageChangeHandler( )">
<FORM>
``` to specify that the JavaScript function "nameChangeHandler( )" be invoked everytime the value of the "name" field of the form changes, and that "ageChangeHandler( )" be invoked every time the "age" field of the form changes because of a user input. Again, these event handlers communicate with the surrogate to transmit the changed value to other collaborators' surrogates where the field, i.e., form element or document element, in the corresponding form or document, respectively, is appropriately changed. This process, however, requires that the WEB-page author be aware of the possibility that the WEB-page will be viewed by multiple users simultaneously, and that the users will fill in the form collaboratively and interactively.

Alternatively, JavaScipt code, for example, in the surrogate, is used to dynamically insert event handlers as follows:

```
document.forms[0].elements[0].onChange=
    changeHandler;
``` to specify that the JavaScript function "nameChangeHandler( )" be invoked everytime the value of the "name" field of the form changes. Again, these event handlers communicate with the surrogate to transmit the changed value to other collaborators surrogates where the field in the corresponding form is appropriately changed. This process, however, does not require that the WEB-page author be aware of the possibility that the WEB-page will be viewed by multiple users simultaneously, and that the users will fill in the form collaboratively and interactively. It does require, however, that the surrogate have the capability to insert event handlers into the document.

The above-noted JavaScript code is an example of code that can be employed to insert event handlers into the document. It will be apparent to those skilled in the art that further fields may be employed along with appropriate code to specify the corresponding changeHandler( ) functions.

Figure 4:
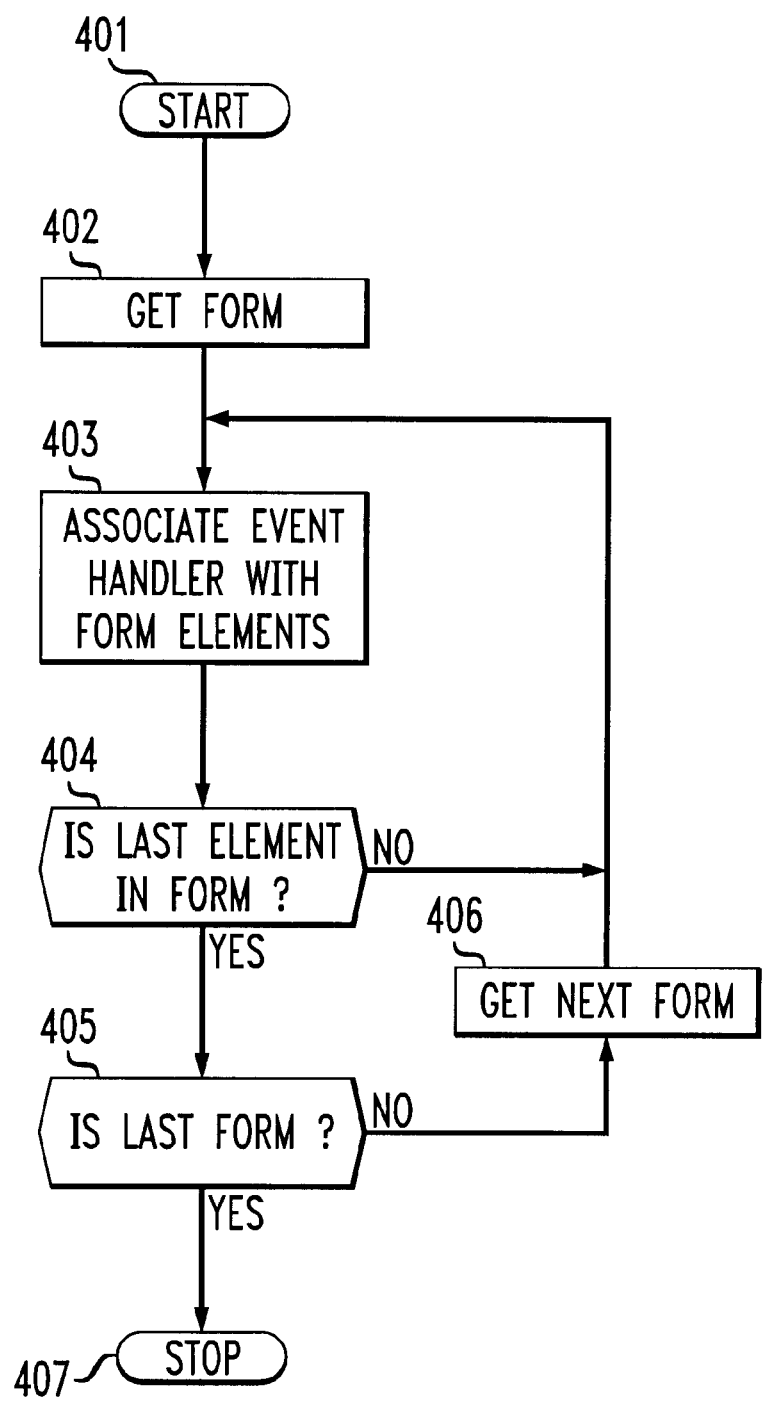
FIG. 4 is a flowchart depicting the steps of applicants' unique process for relating event handlers with form elements employed in the surrogate of FIG. 3.

A process for associating event handlers with form elements is shown in FIG. 4. The process is started in step 401. Thereafter, control is transferred to step 402, which causes a form to be obtained. Then, step 403 associates the event handlers with form elements. Thereafter, step 404 tests to determine if the current form element is the last element in the form. If the test result in step 404 is NO, control is returned to step 403 and steps 403 and 404 are iterated until step 404 yields a YES result and control is transferred to step 405. Step 405 tests to determine if the current form is the last form in the document. If the test result instep 405 is NO, control is transferred to step 406, which causes another form to be obtained. Thereafter, control is transferred to step 403 and steps 403 through 406 are iterated until step 405 yields a YES result and the process is stopped via step 407.

Returning to FIG. 3, upon processing an input and generating an output in step 306, control is transferred to step 310, which tests to determine if there is a user output. If the test result in step 310 is YES, control is transferred to step 311, which sends the user output to a user interface (UI). If the test result in step 310 is NO, control is transferred to step 312, which tests to determine if there is a browser output. If the test result in step 312 is YES, control is transferred to step 313, which sends the browser output to the browser. If the test result in step 312 is NO, control is transferred to step 314, which tests to determine if there is a session output. If the test result in step 314 is YES, control is transferred to step 315, which sends the session output to the session. If the test result in step 314 is NO, control is transferred to steps 302 and 303 and the process is iterated as described above, i.e., steps 302 through 315 are repeated. In this example, as see from the above, the surrogate continuously keeps track of the state of the forms in a document by being notified by the browser through the event handlers of changes in the values of the form elements in a document. When notification of a change is received by the other collaborators' surrogates, the users assume that their document is identical to the source document, and update the corresponding data entry in their form.

Figure 5:
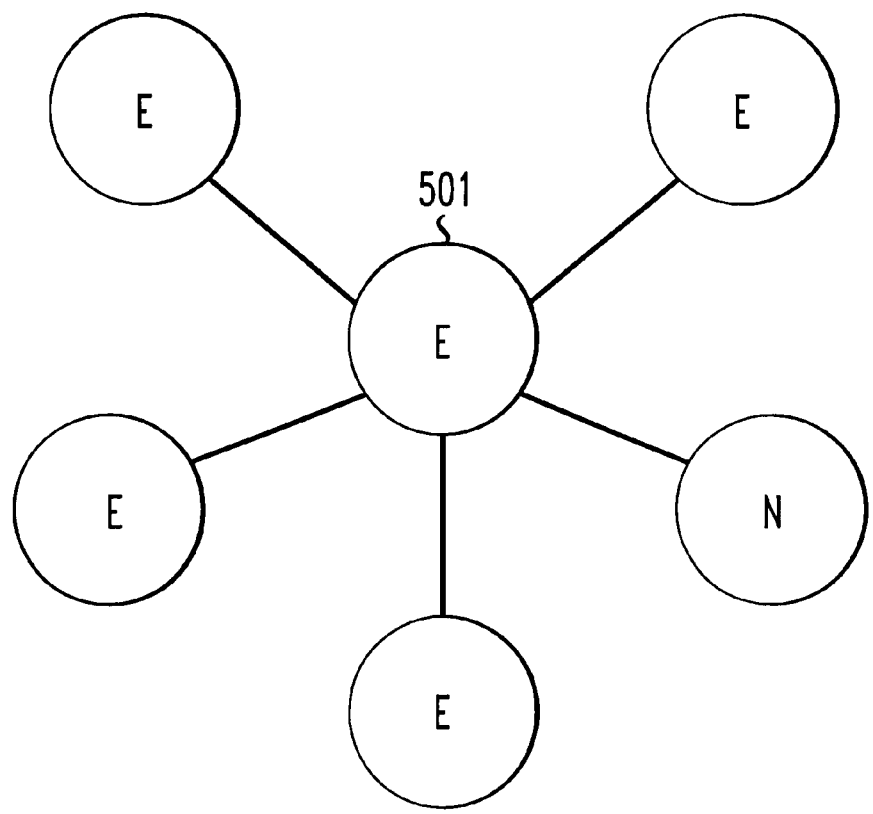
FIG. 5 illustrates a hierarchy of multiple controllers in the system of FIG. 1.

In the coarse of a session, the collaborators may point and click at a specified icon on their computers using a mouse device to make the text-chat connections for exchanging their opinions on filling out the form elements as the HTML documents unfold before them. However, it will be appreciated that a person skilled in the art may program controller 103 to enforce certain access control. For example, controller 103 may afford different collaborators different capabilities during a collaborative session. Controller 103 may also enforce a priority scheme whereby the collaborators take turns to lead the session and communicate with one another. Other computer users who want to either create a session or join an on-going session go through the similar process to that of U-1 through U-N described above. However, a controller may be overloaded at certain point as more and more collaborators joining a particular session regulated by the controller. Because of the server-based architecture of server system 100 where intelligence and information on every user's connection resides in manager 104, the system capacity is readily scaleable to accommodate a growing number of the collaborators, without affecting the service quality. Once the number reaches a predetermined threshold at a controller, manager 104 employs a new controller to connect the excessive collaborators. The new controller and existing controllers for the same session dynamically reorganize themselves in a hierarchy to facilitate communications with one another and their coordination to carry out the session in a synchronous manner FIG. 5 illustrates one such hierarchy, where the existing controllers (denoted by circles marked "E") and the new controller (denoted by a circle marked "N") form a star topology. In this hierarchy, controller 501 acts as an information center and efficiently distributes information from a controller to all other controllers.

Furthermore, as more and more controllers are engaged, the initial capacity of server system 100 may run out. Again, because of the inventive architecture of server system 100, a new controller may be engaged using additional hardware, which can be easily absorbed into server system 100.

Similarly, when the number of sessions exceeds a predetermined threshold, multiple managers similar to manager 104 are instituted and the managers are dynamically reorganized in a hierarchy similar to that of FIG. 5.

The foregoing merely illustrates the principles of the invention. It will be appreciated that a person skilled in the art can readily devise numerous other systems, which embody the principles of the invention and, therefore, are within its spirit and scope.

What is claimed is:

1. A method for use in a user device including a browser for obtaining information from a communication system, the browser causing a document to be displayed including at least one document element for containing a prescribed data value, the method comprising the steps of:

creating a surrogate in said user device;

said surrogate including the steps of utilizing at least one event handler to indicate any change in said prescribed data value of said at least one document element;

supplying a representation of any detected change indicated by an event handler in said prescribed data value of said at least one document element as a browser input;

processing said browser input to generate a prescribed output; and supplying said generated prescribed output as an output to said communication system.

2. The method as defined in claim 1 wherein said surrogate further includes a step of initiating a surrogate cycle after a prescribed interval has elapsed of not receiving an input.

3. The method as defined in claim 1 wherein said communication system includes a World Wide Web (WWW).

4. The method as defined in claim 1 wherein said prescribed output is a representation of a changed data value for said at least one document element.

5. The method as defined in claim 4 wherein said step of processing includes processing said browser input to generate a session output representative of said change in said at least one document element data value.

6. The method as defined in claim 1 wherein individual ones of a plurality of document elements are associated on a one-to-one basis with a corresponding plurality of event handlers.

7. The method as defined in claim 1 wherein said document element includes at least one form having at least one form element for containing a prescribed data value, and the at least one event handler is a HTML/JavaScript code as follows <FORM>

<INPUT TYPE=TEXT ONCHANGE= "XXXXChangeHandler( )">

<FORM> where XXXX is a form field, i.e., element, and the JavaScript function "XXXXChangeHandler" is invoked every time the XXXX form element data value changes.

8. The method as defined in claim 1 wherein said surrogate inserts at least one event handler in the document.

9. The method as defined in claim 8 wherein said document element includes at least one form having at least one form element for containing a prescribed data value, and a plurality of event handlers are associated on a one-to-one basis with a corresponding plurality of said form elements.

10. The method as defined in claim 8 wherein said document element includes at least one form having at least one form element for containing a prescribed data value, and said at least one event handler is inserted in said document using JavaScript code in said surrogate as follows document.forms[w].elements[y].onChange= changeHandler, where "w" is a form number and "y" is an element number in a form, to specify that the JavaScript function "XXXXChangeHandler( )" be invoked every time the data value of the "XXXX" field, i.e., element, of the form changes.

11. A method for use in a server system that provides communication in synchrony among user devices in a session via a communication system, at least a first user device and an at least second user device being in said session, each user device including a browser for obtaining information from said server system, each browser causing a document to be displayed at each user device including at least one document element for containing a prescribed data value, the method comprising the steps of:

creating a surrogate in each of said user devices;

said surrogate including the steps of utilizing at least one event handler to indicate any change in said prescribed data value of said at least one document element;

supplying a representation of any detected change indicated by an event handler in said prescribed data value of said at least one document element as a browser input;

processing said browser input to generate a prescribed output; and supplying said generated prescribed output as an output to said communication system to be supplied to others of said surrogates in others of said user devices, whereby a plurality of users can collaboratively make changes in said at least one document element data value.

12. The method as defined in claim 11 wherein said surrogate further includes a step of initiating a surrogate cycle after a prescribed interval has elapsed of not receiving an input.

13. The method as defined in claim 11 wherein said communication system includes a World Wide Web (WWW).

14. The method as defined in claim 11 wherein said prescribed output is a representation of a changed data value for said at least one document element.

15. The method as defined in claim 14 wherein said step of processing includes processing said browser input to generate a session output representative of said change in said at least one document element data value.

16. The method as defined in claim 11 wherein individual ones of a plurality of document elements are associated on a one-to-one basis with a corresponding plurality of event handlers.

17. The method as defined in claim 11 wherein said document element includes at least one form having at least one form element for containing a prescribed data value, and the at least one event handler is a HTML/JavaScript code as follows <FORM>
<INPUT TYPE=TEXT ONCHANGE= "XXXXChangeHandler( )">
<FORM> where XXXX is a form field, i.e., element, and the JavaScript function "XXXXChangeHandler" is invoked every time the XXXX form element data value changes.

18. The method as defined in claim 11 wherein said surrogate inserts at least one event handler in the document.

19. The method as defined in claim 18 wherein a plurality of event handlers are associated on a one-to-one basis with a corresponding plurality of form elements in the document.

20. The method as defined in claim 18 wherein said document element includes at least one form having at least one form element for containing a prescribed data value, and said at least one event handler is inserted in said document using JavaScript code in said surrogate as follows document.forms[w].elements[y].onChange= changeHandler, where "w" is a form number and "y" is an element number in a form, to specify that the JavaScript function "XXXXChangeHandler( )" be invoked every time the data value of the "XXXX" field, i.e., element, of the form changes.

21. Apparatus for use in a user device including a browser for obtaining information from a communication system, the browser causing a document to be displayed including at least one document element for containing a prescribed data value, the user device comprising:

a first processor responsive to supplied programming code for creating a surrogate in said user device;

said surrogate including at least one event handler to indicate any change in said prescribed data value of said at least one document element;

a supplier for supplying a representation of any detected change indicated by an event handler in said prescribed data value of said at least one document element as a browser input;

a generator responsive to said browser input for generating a prescribed output; and an outputter for supplying as an output to said communication system said generated prescribed output.

22. The apparatus as defined in claim 21 wherein said surrogate further includes a timer for initiating a surrogate cycle after a prescribed interval has elapsed of not receiving an input.

23. The apparatus as defined in claim 21 wherein said communication system includes a World Wide Web (WWW).

24. The apparatus as defined in claim 21 wherein said prescribed output is a representation of a changed data value for said at least one document element.

25. The apparatus as defined in claim 24 wherein said generator includes a second processor for processing said browser input to generate a session output representative of said change in said at least one document element data value.

26. The apparatus as defined in claim 21 wherein individual ones of a plurality of documents elements are associated on a one-to-one basis with a corresponding plurality of event handlers.

27. The apparatus as defined in claim 21 wherein said document element includes at least one form having at least one form element for containing a prescribed data value, and the at least one event handler is a HTML/JavaScript code as follows <FORM>
<INPUT TYPE=TEXT ONCHANGE= "XXXXChangeHandler( )">
<FORM> where XXXX is a form field, i.e., element, and the JavaScript function "XXXXChangeHandler" is invoked every time the XXXX form element data value changes.

28. The apparatus as defined in claim 21 wherein said surrogate inserts at least one event handler in the document.

29. The apparatus as defined in claim 28 wherein said document element includes at least one form having at least one form element for containing a prescribed data value, and a plurality of event handlers are associated on a one-to-one basis with a corresponding plurality of form elements in the document.

30. The apparatus as defined in claim 28 wherein said at least one event handler is inserted by said surrogate into said document using JavaScript code in said surrogate as follows
document.forms[w].elements[y].onChange= changeHandler,
where "w" is a form number and "y" is an element number in a form, to specify that the JavaScript function "XXXXChangeHandler( )" be invoked every time the data value of the "XXXX" field, i.e., element, of the form changes.

31. Apparatus for use in a server system that provides communication in synchrony among user devices in a session via a communication system, at least a first user device and an at least second user device being in said session, each user device including a browser for obtaining information from said server system, each browser causing a document to be displayed at each user device including at least one document element for containing a prescribed data value, each of the user devices comprising:
a first processor responsive to supplied programming code for creating a surrogate in said user device;
said surrogate including
at least one event handler to indicate any change in said prescribed data value of said at least one document element;
a supplier for supplying a representation of any detected change indicated by an event handler in said prescribed data value of said at least one document element as a browser input;
a generator responsive to said browser input for generating a prescribed output; and
an outputter for supplying as an output to said communication system said generated prescribed output to be supplied to others of said surrogates in others of said user devices,
whereby a plurality of users can collaboratively make changes in said at least one document element value.

32. The apparatus as defined in claim 31 wherein said surrogate further includes a timer for initiating a surrogate cycle after a prescribed interval has elapsed of not receiving an input.

33. The apparatus as defined in claim 31 wherein said communication system includes a World Wide Web (WWW).

34. The apparatus as defined in claim 31 wherein said prescribed output is a representation of a changed data value for said at least one document element.

35. The apparatus as defined in claim 34 wherein said generator includes a second processor for processing said browser input to generate a session output representative of said change in said at least one document element data value.

36. The apparatus as defined in claim 31 wherein individual ones of a plurality of document elements are associated on a one-to-one basis with a corresponding plurality of event handlers.

37. The apparatus as defined in claim 31 wherein said document element includes at least one form having at least one form element for containing a prescribed data value, and the at least one event handler is a HTML/JavaScript code as follows
<FORM>
<INPUT TYPE=TEXT ONCHANGE= "XXXXChangeHandler( )">
<FORM>
where XXXX is a form field, i.e., element, and the JavaScript function "XXXXChangeHandler" is invoked every time the XXXX form element data value changes.

38. The apparatus as defined in claim 31 wherein said surrogate inserts at least one event handler in the document.

39. The apparatus as defined in claim 38 wherein said document element includes at least one form having at least one form element for containing a prescribed data value, and a plurality of event handlers are associated on a one-to-one basis with a corresponding plurality of said form elements.

40. The apparatus as defined in claim 38 wherein said document element includes at least one form having at least one form element for containing a prescribed data value, and said at least one event handler is inserted by said surrogate into said document using JavaScript code in said surrogate as follows
document.forms[w].elements[y].onChange= changeHandler,
where "w" is a form number and "y" is an element number in a form, to specify that the JavaScript function "XXXXChangeHandler( )" be invoked every time the data value of the "XXXX" field, i.e., element, of the form changes.

41. Apparatus for use in a user device including a browser for obtaining information from a communication system, the browser causing a document to be displayed including at least one document element for containing a prescribed data value, the user device comprising:
means responsive to supplied programming code for creating a surrogate in said user device;
said surrogate including
means for utilizing at least one event handle to indicate any change in said prescribed data value of said at least one document element;
means for supplying a representation of any detected change in said prescribed data value of said at least one document element as a browser input;
means responsive to said browser input for generating a prescribed output; and
means for supplying as an output to said communication system said generated prescribed output.

42. The invention as defined in claim 41 wherein said surrogate further includes a step of initiating a surrogate cycle after a prescribed interval has elapsed of not receiving an input.

43. The invention as defined in claim 41 wherein said communication system includes a World Wide Web (WWW).

44. The invention as defined in claim 41 wherein said prescribed output is a representation of a changed data value for said at least one document element.

45. The invention as defined in claim 44 wherein said step of processing includes processing said browser input to generate a session output representative of said change in said at least one document element data value.

46. The invention as defined in claim 41 wherein individual ones of a plurality of document elements are associated on a one-to-one basis with a corresponding plurality of event handlers.

47. The invention as defined in claim 41 wherein said document element includes at least one form having at least one form element for containing a prescribed data value, and the at least one event handler is a HTML/JavaScript code as follows

```
<FORM>
<INPUT    TYPE=TEXT    ONCHANGE=
   "XXXXChangeHandler( )">
<FORM>
```
where XXXX is a form field, i.e., element, and the JavaScript function "XXXXChangeHandler" is invoked every time the XXXX form element data value changes.

48. The invention as defined in claim 41 wherein said surrogate includes means for inserting at least one event handler in the document.

49. The invention as defined in claim 48 wherein said document element includes at least one form having at least one form element for containing a prescribed data value, and a plurality of event handlers are associated on a one-to-one basis with a corresponding plurality of form elements in the document.

50. The invention as defined in claim 48 wherein said document element includes at least one form having at least one form element for containing a prescribed data value, and said means for inserting inserts said at least one event handler is said document using JavaScript code in said surrogate as follows document.forms[w].elements[y].onChange=
      changeHandler, where "w" is a form number and "y" is an element number in a form, to specify that the JavaScript function "XXXXChangeHandler( )" be invoked every time the data value of the "XXXX" field, i.e., element, of the form changes.

51. A server system that provides communication in synchrony among user devices in a session via a communication system, comprising:
   a first user device;
   an at least second user device, said first user device and said at least second user device being used in said session and each user device including a browser for obtaining information from said server system, each browser causing a document to be displayed at each user device including at least one document element for containing a prescribed data value;
   each of said user devices further including
      a first processor responsive to supplied programming code for creating a surrogate in said user device;
      said surrogate including
      at least one event handler to indicate any change in said prescribed data value of said at least one document element;
      a supplier for supplying a representation of any detected change indicated by an event handler in said prescribed data value of said at least one document element as a browser input;
      a generator responsive to said browser input for generating a prescribed output; and
      an outputter for supplying as an output to said communication system said generated prescribed output to be supplied to at least one other of said surrogates in at least one other of said user devices, whereby a plurality of users can collaboratively make changes in said at least one document element value.

52. The invention as defined in claim 51 wherein said surrogate further includes a timer for initiating a surrogate cycle after a prescribed interval has elapsed of not receiving an input.

53. The invention as defined in claim 51 wherein said communication system includes a World Wide Web (WWW).

54. The invention as defined in claim 51 wherein said prescribed output is a representation of a changed data value for said at least one document element.

55. The invention as defined in claim 54 wherein said generator includes a second processor for processing said browser input to generate a session output representative of said change in said at least one document element data value.

56. The invention as defined in claim 51 wherein individual ones of a plurality of document elements are associated on a one-to-one basis with a corresponding plurality of event handlers.

57. The invention as defined in claim 51 wherein said document element includes at least one form having at least one form element for containing a prescribed data value, and the at least one event handler is a HTML/JavaScript code as follows

```
<FORM>
<INPUT    TYPE=TEXT    ONCHANGE=
   "XXXXChangeHandler( )">
<FORM>
```
where XXXX is a form field, i.e., element, and the JavaScript function "XXXXChangeHandler" is invoked every time the XXXX form element data value changes.

58. The invention as defined in claim 51 wherein said surrogate inserts at least one event handler in the document.

59. The invention as defined in claim 58 wherein said document element includes at least one form having at least one form element for containing a prescribed data value, and a plurality of event handlers are associated on a one-to-one basis with a corresponding plurality of form elements in the document.

60. The invention as defined in claim 58 wherein said document element includes at least one form having at least one form element for containing a prescribed data value, and said at least one event handler is inserted by said surrogate into said document using JavaScript code in said surrogate as follows document.forms[w].elements[y].onChange=
      changeHandler, where "w" is a form number and "y" is an element number in a form, to specify that the JavaScript function "XXXXChangeHandler( )" be invoked every time the data value of the "XXXX" field, i.e., element, of the form changes.

* * * * *